No. 690,570. Patented Jan. 7, 1902.
H. L. FISHER.
PANORAMIC ATTACHMENT FOR CAMERAS.
(Application filed Mar. 3, 1900.)
(No Model.)
2 Sheets—Sheet 1.
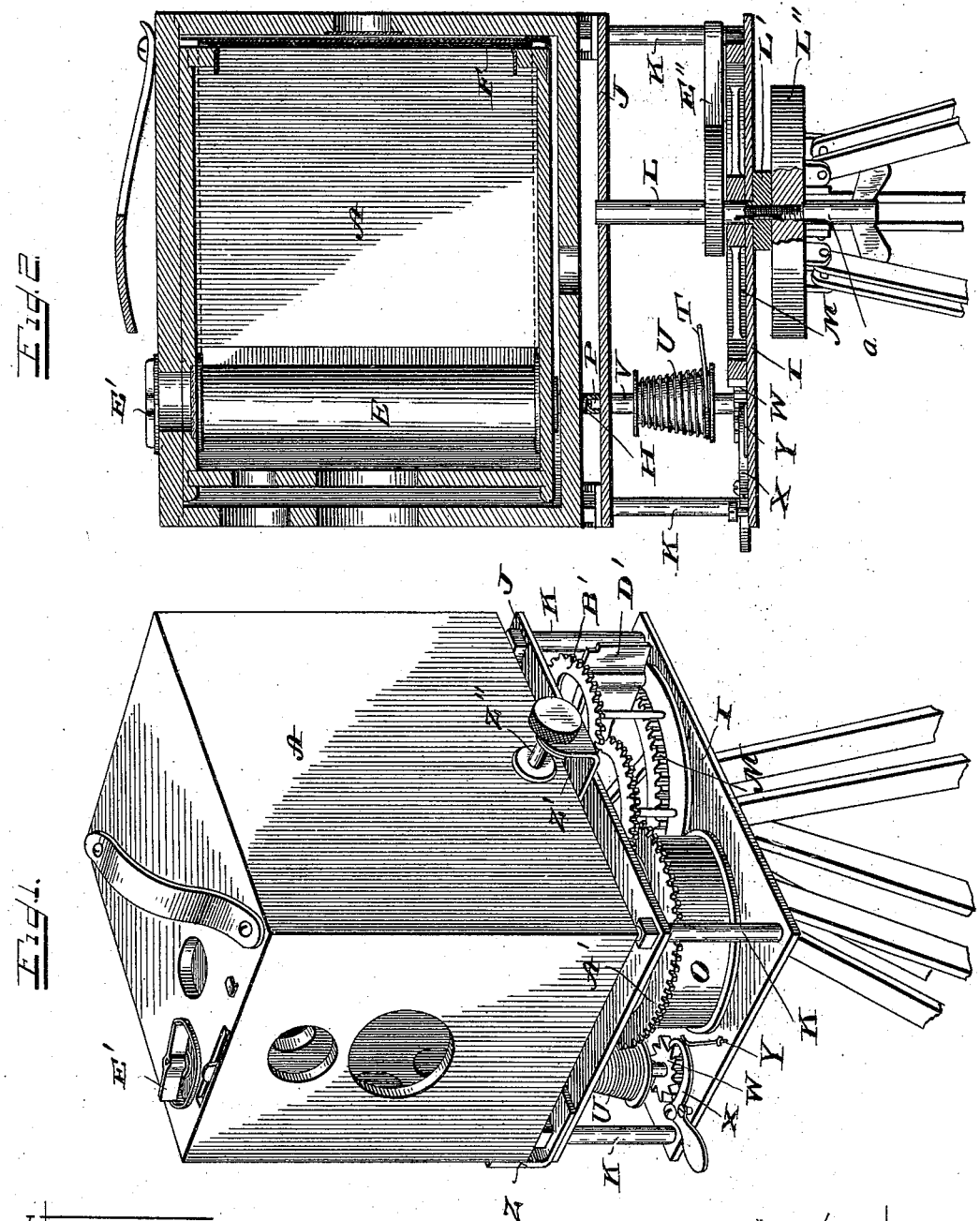

No. 690,570. Patented Jan. 7, 1902.
H. L. FISHER.
PANORAMIC ATTACHMENT FOR CAMERAS.
(Application filed Mar. 3, 1900.)
(No Model.) 2 Sheets—Sheet 2.
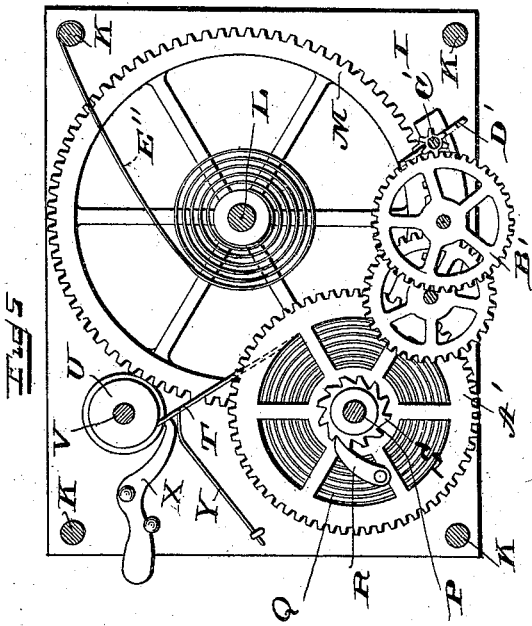
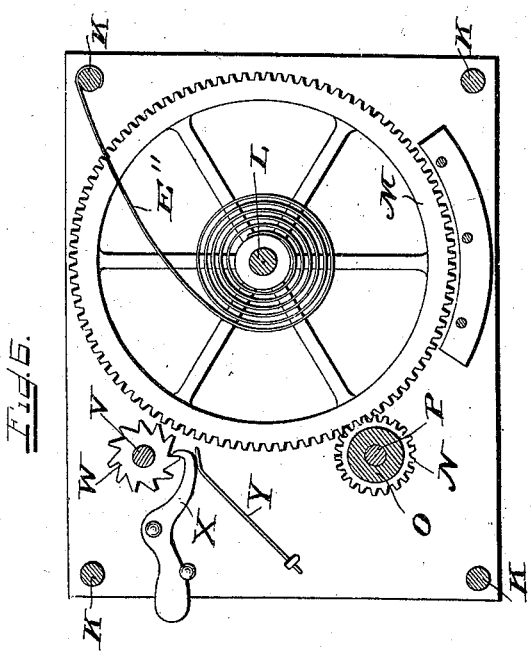
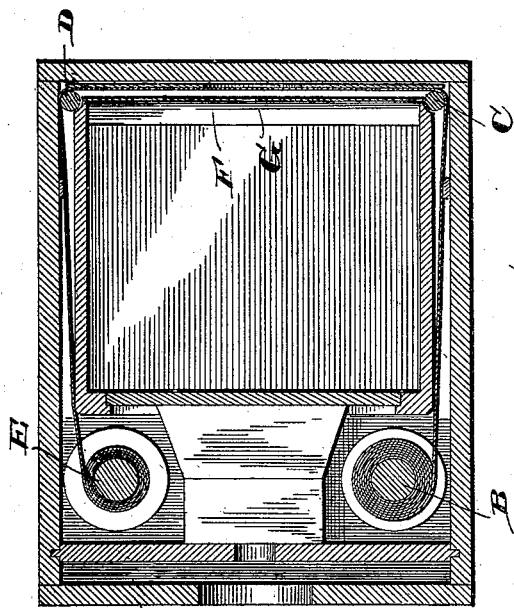
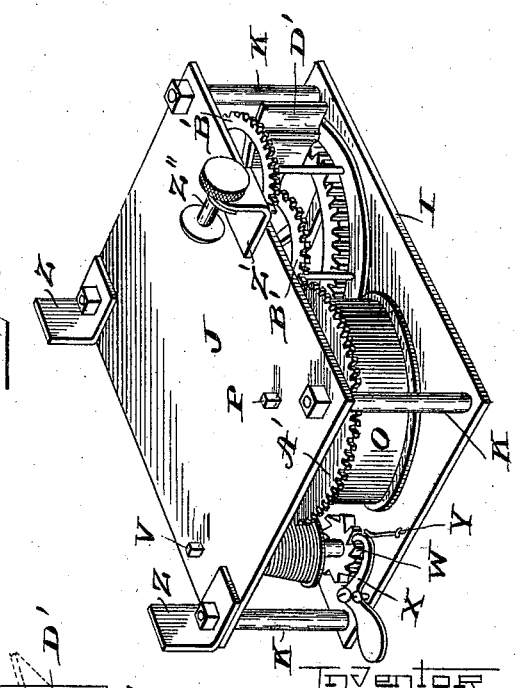
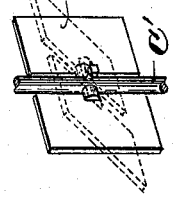

UNITED STATES PATENT OFFICE.

HARVEY L. FISHER, OF CHICAGO, ILLINOIS, ASSIGNOR, BY DIRECT AND MESNE ASSIGNMENTS, TO BENJAMIN J. DOWNER.

PANORAMIC ATTACHMENT FOR CAMERAS.

SPECIFICATION forming part of Letters Patent No. 690,570, dated January 7, 1902.

Application filed March 3, 1900. Serial No. 7,196. (No model.)

*To all whom it may concern:*

Be it known that I, HARVEY L. FISHER, a citizen of the United States, residing at Chicago, in the county of Cook, in the State of Illinois, have invented a certain new and useful Panoramic Attachment for Cameras, of which the following is a description, reference being had to the accompanying drawings, forming a part of this specification.

My invention relates to cameras which are adapted to be partly or completely revolved upon a vertical axis for the purpose of taking a panoramic view and in which the film is automatically drawn across the exposure-opening in proper time as the camera revolves; and it consists particularly in a novel attachment or operating device for revolving the camera and drawing the film across the exposure-opening, which attachment or operating device may be readily used with any ordinary camera to which it is adapted, and thereby serve to convert such camera into a panoramic camera.

In the accompanying drawings, Figure 1 is a perspective view of a camera mounted upon a tripod and equipped with my novel operating attachment for taking panoramic views; Fig 2, a middle vertical section through the camera proper and the operating attachment, omitting details of the camera not essential to an explanation of my invention; Fig. 3, a horizontal section through the camera proper; Fig. 4, a perspective view of the operating attachment with the camera removed; Fig. 5, a sectional plan view of Fig. 4 immediately beneath the top plate thereof; Fig. 6, a sectional plan view corresponding to Fig. 5, but in a lower plane; and Fig. 7, a detail of the governor device.

The camera A, Fig. 1, in connection with which I have illustrated my invention, is a camera of familiar construction, in which the unexposed film is carried on a supply-spool B at the forward left-hand corner of the camera, Fig. 3, and led thence rearward along the side of the camera to an idle roller C at the left-hand rear corner of the camera, thence across the back of the camera and over a similar idle roller D at the right-hand rear corner of the camera, and thence forward around the storage-spool E at the right-hand forward corner of the camera, the spools B and E being removable, as usual, and the storage-spool E being provided at the top of the camera with a thumb-piece E', by which the spool may be turned to draw forward and wind up the film when the camera is being used in the ordinary way. The only additions I make to this ordinary hand-camera for the purpose of adapting it for use as a panoramic camera are a plate F, removably inserted in the back of the camera and provided with a vertical exposure-slit G at its middle, and a depending extension H of the spindle of the storage-spool E, Fig. 2, suitably formed to engage and be turned by the upper end of a rotating spindle of the operating attachment, as hereinafter described.

The panoramic operating attachment which constitutes my invention is adapted to turn upon a vertical spindle or other suitable bearing secured to the top of the tripod or support and to have the camera secured to it, so as to turn with it. A spring-actuated mechanism carried by and forming part of the attachment is so connected with the fixed spindle or support as to revolve the camera when permitted to do so and is also connected with the film-operating means of the camera, so as to properly advance the film as the camera revolves upon its support.

In the present instance the attachment comprises a framework composed of a bottom plate I and top plate J, rigidly secured together by four corner-posts K and adapted to turn upon a fixed spindle or post L, which latter constitutes the pivot or axial support of the attachment. In the form shown in the accompanying drawings its lower end is provided with an enlargement or base L', adapted to rest upon the top L'' of the tripod, Fig. 2, and having a central screw-threaded hole adapted to receive the upper end of a clamping-screw *a*, passed upward through the top of the tripod and by means of which the spindle L may be firmly secured to the tripod.

Fast upon the spindle L, in the present instance immediately above the bottom plate I of the framework, is a large gear-wheel M, which meshes with a smaller gear or pinion N, fast upon the under side of a spring drum or casing O, which is mounted to turn upon a vertical spindle P and contains a coiled spring Q, secured at its inner end to said spindle and at its outer end to the drum or casing.

So far as the operation of the parts is concerned when in use the spindle P is a fixed spindle; but for the purpose of enabling it to be employed to initially wind up the coiled spring Q within the drum O or to readjust the tension of said spring at any subsequent time it is rotatably mounted in the framework and normally held in fixed position against the stress of the spring Q by a pawl R, pivoted to the under side of the top plate J and engaging a ratchet S, fast upon the spindle. The upper end of the spindle projects above the top plate J, Fig. 4, and is squared to receive a winding-key; but, as before stated, this key is employed only for the purpose of initially winding up the spring Q or for readjusting it when necessary.

Secured to and wound around the spring-drum O is one end of a cord T, whose opposite end is secured to and wound around a cone U, fast upon a spindle V, rotatably mounted at its upper and lower ends in the top and bottom plates of the framework and having its upper end projecting above the top plate J, as shown in Fig. 4. This spindle V is coincident with the spindle of the film-storage spool E of the camera when the latter is placed in position upon the operating attachment, as in Fig. 2, and the depending extension H of the spindle of said spool is provided with a recess or socket, which fits over the squared upper end of the spindle V, and thereby locks the two spindles together, so that when the spindle V is turned, as hereinafter described, it will turn the film-storage spool and draw forward the film and wind it up upon said spool. Any suitable form of connection between the spindle V and storage-spool spindle for this purpose may of course be employed; but it is convenient to employ that which I have illustrated, for the reason that the squared upper end of the spindle V is adapted to receive the same winding-key which fits the squared upper end of the spindle P. If any other form of connection between the spindle V and storage-spool spindle be desired, however, the lower end of the spindle V may be projected below the bottom plate of the framework and squared to receive the winding-key at that end.

A ratchet W is made fast upon the spindle V immediately above the bottom plate I of the framework, Fig. 6, and is engaged by the inner hooked end of a holding-pawl X of lever form, whose opposite end projects beyond the framework and serves as a handle, by means of which the pawl may be engaged with and disengaged from the ratchet. A spring Y, bearing against the inner end of the pawl X, is so arranged as to serve to yieldingly hold the pawl in engagement with the ratchet when engaged therewith and to hold it entirely out of engagement with the ratchet when disengaged therefrom.

Under the above construction and arrangement of parts it will be understood that if the winding-key be applied to the cone-spindle V (the holding-pawl X being at the time in engagement with the ratchet W) and the spindle turned in a direction to draw the cord T from the spring-drum O and wind it upon the cone U the spring-drum will be turned in a direction opposite to that in which the spring Q tends to turn it and said spring be put under additional tension and that if the holding-pawl X be then disengaged from the ratchet of the cone-spindle V the spring Q will at once turn the drum O backward until the cord T has been completely withdrawn from the cone U and again wound upon the drum O. The turning of the drum O backward to normal position, as described, will not only serve to rotate the cone U and spindle V as the cord T is withdrawn from the cone, but will also serve to turn the entire framework upon the fixed spindle or post L, constituting its pivotal axis, since the drum O is geared by its pinion N to the gear-wheel M, fast upon said fixed spindle or post L, as heretofore described, and in the present instance the length of the cord T and proportion of the parts are such that the movement permitted the drum O by the unwinding of the full length of the cord T from the cone U and winding of it upon the drum O will serve to give the framework of the operating attachment one complete revolution.

With the foregoing explanation of the construction and mode of operation of my novel operating attachment its employment in connection with a hand-camera for the purpose of converting the latter into a panoramic camera may be briefly explained. For this purpose it is simply necessary that the camera proper be secured in some suitable manner upon the top of the operating attachment, with the spindle of its film-storage spool engaged with or connected to the cone-spindle V, whereupon by disengaging the pawl X from the ratchet W on said cone-spindle (the latter having been previously turned with the winding-key and the cord T withdrawn from the drum O and wound upon the cone U, as described) the spring Q will be permitted to turn the drum O backward to normal position and withdraw the cord T from the cone U and wind it up again upon the drum O, with the result that the operating attachment, with the camera secured to it, will be given a complete revolution, while during such revolution the cone-spindle V will turn the storage-spool and draw forward the film from the supply-spool across the exposure-slit G in the plate F at the back of the camera and wind it upon the storage-spool E.

In the present instance for the purpose of removably securing the camera upon the top of the operating attachment I have provided the top plate J of the latter at its two right-hand corners with upturned plates Z, Fig. 4, against which the right side of the camera may fit, and to the middle of the opposite side of the plate J, I have secured a similar upturned plate Z', in which is mounted a clamping-screw Z", adapted to bear against the left side of the camera, Fig. 1, and clamp the same between said screw and the plates Z' at the opposite side of the camera, and thereby secure it to the operating attachment.

Inasmuch as the size of the roll of film upon the storage-spool gradually increases as the film is drawn forward from the supply-spool and wound upon the storage-spool and inasmuch as it is desirable that all parts of the film shall have the same time exposure during the revolution of the camera, I have provided means for gradually reducing the speed of the storage-spool as the camera revolves and the film is wound upon said spool, said means consisting in the cone U upon the actuating-spindle V for the storage-spool. The cord T is secured to this cone at its lower and larger end and is wound upward on the same when the spindle is turned with the key to withdraw the cord from the drum O preparatory to an operation of the camera, and it results from this that at the beginning of the revolution of the camera and withdrawal of the cord T from the cone U the withdrawal of a comparatively short length of the cord will serve to give the cone and spindle a complete revolution, while as the operation proceeds the withdrawal of a gradually-increasing length of cord is required to give the cone and spindle additional successive revolutions. Inasmuch as the spring-drum O is of uniform diameter and turns at an approximately uniform speed, the withdrawal of the cord T from the cone U will serve to turn the spindle V, and consequently the storage-spool, at a gradually-decreasing rate of speed during the revolution of the camera, with the result that the film may be given substantially the same time exposure throughout its entire length. The same result of turning the storage-spool at a gradually-decreasing rate of speed might, of course, be accomplished in substantially the same manner by providing the spring-drum O with the cone-surface and employing the winding-surface of uniform diameter upon the spindle V, thereby simply transposing the two winding-surfaces.

For the purpose of regulating the speed of movement of the drum O under the action of the spring Q and causing it to turn at as nearly a uniform rate of speed as possible any suitable brake or governor may be applied to or connected with it. In the present instance I have illustrated a governor of familiar type, but embodying a novel feature of especial advantage in the employment of the governor for its present purpose. The drum O has secured to its upper end a gear-wheel A', which is connected by a train of multiplying-gears B' to a vertical spindle C', provided with flat projecting blades or fans D', Figs. 1, 4, and 5. These blades D' are adjustable upon the spindle C', as shown in Fig. 7, to enable them to be placed at different angles to their plane of revolution. When placed at right angles to such plane, the air will of course offer the maximum resistance to their revolution, and such resistance will decrease accordingly as the blades are set at angles more nearly approaching their plane of revolution. By adjusting the blades at different angles, therefore, the effect of the governor upon the speed of revolution of the spring-drum may be regulated as desired, the drum being permitted a minimum speed when the blades are set at right angles to their plane of movement and permitted a greater speed as the blades are adjusted toward their plane of movement. In this manner and by this means the speed of revolution of the camera may be regulated so as to cause a greater or less time exposure during its revolution in accordance with the condition of the light at the time of use.

In Fig. 6 there is shown a coiled spring E'', surrounding the hub of the large gear-wheel M and secured at its inner end to said hub and at its outer end to one of the corner-posts K of the framework. This is a comparatively weak spring and is employed simply for the purpose of preserving a firm engagement between the teeth of the wheel M and the teeth of the pinion N on the spring-drum O and preventing loose play between them. While desirable for this purpose, it is not in any way essential and may be omitted.

It will be understood that the only thing essential in respect to the connection between the motor-spring Q and the fixed post L or pivotal support of the operating attachment is that the motor-spring shall operate to revolve the attachment when permitted to act for that purpose. Such being the case, other forms of connection may obviously be substituted for the fixed gear-wheel M and the pinion N, gearing it to the casing O of the motor-spring.

Having thus fully described my invention, I claim—

1. A panoramic operating attachment for cameras adapted to revolve upon a vertical axis and to have the camera removably secured to it, said attachment comprising a spring-actuated mechanism suitably connected with the pivotal support of the operating attachment and with the film-operating means of the camera to revolve the camera upon its pivotal support and properly advance the film within the camera, substantially as described.

2. A panoramic operating attachment for cameras adapted to revolve upon a vertical axis and to have the camera removably secured to it, said attachment comprising a spring-actuated mechanism suitably connected to the pivotal support of the attachment and to the storage-spool of the camera to revolve the camera upon its pivotal support and to turn the storage-spool to draw forward and wind up the film within the camera, substantially as described.

3. A panoramic operating attachment for cameras adapted to revolve upon a vertical axis and to have the camera removably secured to it, said attachment comprising a rotatable spindle adapted to be connected with the storage-spool spindle of the camera when the latter is secured in position upon the operating attachment, and a spring-actuated mechanism connected to said spindle and to the pivotal support of the operating attachment, to revolve the attachment upon its pivotal support and to turn the storage-spool to draw forward and wind up the film within the camera, substantially as described.

4. A panoramic operating attachment for cameras adapted to revolve upon a vertical axis and to have the camera removably secured to it, said attachment comprising a rotatable spindle adapted to be connected with the storage-spool spindle of the camera when the latter is secured in position upon the operating attachment, and a spring-actuated mechanism connected with the pivotal support of the operating attachment to revolve the attachment upon its support and operating to turn the rotatable spindle at a gradually-decreasing rate of speed during such revolution of the attachment upon its support, substantially as and for the purpose described.

5. A panoramic operating attachment for cameras, comprising a vertical spindle or post adapted to be detachably secured to a tripod or other support, a suitable frame mounted to turn upon said fixed spindle and adapted to have a camera detachably secured in position upon it, a rotatable spindle mounted in said frame and adapted to be connected with the film-operating means of the camera, and a spring-actuated mechanism mounted in said frame and connected to said fixed and rotatable spindles, for revolving the frame upon the fixed spindle and turning the rotatable spindle to advance the film within the camera, substantially as described.

6. A panoramic operating attachment for cameras, comprising a vertical spindle or post adapted to be secured to a tripod or other support, a fixed gear-wheel secured to said spindle or post, a suitable frame mounted to turn upon said spindle, a rotatable spindle mounted in said frame, and a spring-actuated drum or wheel mounted in the frame and geared to said fixed wheel and also connected with the rotatable spindle, for the purpose of revolving the frame and turning the rotatable spindle to advance the film within the camera, substantially as described.

7. A panoramic operating attachment for cameras, comprising a vertical spindle or post adapted to be secured to a tripod or other support, a suitable frame mounted to turn upon said spindle and adapted to have the camera detachably secured to it, a rotatable spindle mounted in said frame and adapted to be connected with the film-operating means of the camera, and a spring-actuated mechanism mounted in said frame and connected with the fixed spindle or post to revolve the frame, and operating to turn the rotatable spindle at a gradually-decreasing rate of speed during such revolution of the frame, substantially as and for the purpose described.

8. A panoramic operating attachment for cameras, comprising a vertical spindle or post adapted to be secured to a tripod or other support, a suitable frame mounted to turn thereon and adapted to have the camera detachably secured to it, a rotatable spindle mounted in said frame and adapted to be connected with the film-operating means of the camera, a spring-actuated drum or wheel also mounted in said frame and connected with the fixed spindle to revolve the frame about said spindle, and a cord wound at one end around the spring-drum and at its opposite end around the rotatable spindle, the winding-surface upon which one end of said cord is wound being cone-shaped, for the purpose described.

9. A panoramic operating attachment for cameras, comprising a vertical spindle or post adapted to be secured to a tripod or other support, a suitable frame mounted to turn thereon and adapted to have the camera detachably secured to it, a rotatable spindle mounted in said frame and adapted to be connected with the film-operating means of the camera, a winding-cone secured upon said spindle, a spring-actuated drum or wheel also mounted in said frame and connected with the fixed spindle to revolve the frame about said spindle, and a cord wound at one end upon the spring-drum and at its opposite end upon said cone, for the purpose described.

10. A panoramic operating attachment for cameras, comprising a vertical spindle or post adapted to be secured to a tripod or other support, a suitable frame mounted to turn thereon and adapted to have the camera secured to it, a rotatable spindle mounted in said frame in position to coincide with the spindle of the storage-spool of the camera when the latter is placed in position upon said frame and adapted at such time to interlock with said spool-spindle, and a spring-actuated mechanism connected to the fixed and rotatable spindles for revolving the frame and turning the storage-spool of the camera, substantially as described.

11. A panoramic operating attachment for cameras, comprising a vertical spindle or post adapted to be secured to a tripod or other support, a suitable frame mounted to turn thereon and adapted to have the camera detachably secured to it, a rotatable spindle mounted in said frame and adapted to coincide with the spindle of the storage-spool of the camera when the latter is placed in position upon the frame and to interlock with such spindle, a spring-actuated drum or wheel also mounted in said frame and connected with the fixed spindle or post to revolve the frame about said spindle, and a cord wound at one end upon said spring-drum and at its opposite end upon said rotatable spindle, the winding-surface for one end of said cord being tapered or cone-shaped, for the purpose described.

12. A panoramic operating attachment for cameras, comprising a vertical spindle or post adapted to be secured to a tripod or other support, a suitable frame mounted to turn thereon and adapted to have the camera detachably secured to it, a rotatable spindle mounted in said frame and adapted to coincide with the spindle of the storage-spool of the camera when the latter is placed in position upon the frame and to interlock with such spindle, a winding-cone secured upon said rotatable spindle, a spring-actuated drum or wheel also mounted in said frame and connected with the fixed spindle or post to revolve the frame about said spindle, and a cord wound at one end upon said drum and at its opposite end upon the cone on the rotatable spindle, for the purpose described.

13. In panoramic operating means for cameras, the combination of suitable spring-actuated mechanism for revolving the camera, and means intermediate said mechanism and the film-operating means of the camera operating to advance the film at a uniform speed during the revolution of the camera, substantially as described.

14. In panoramic operating means for cameras, the combination of suitable spring-actuated mechanism for revolving the camera, a rotatable spindle for actuating the film-operating means of the camera, and means intermediate said spring-actuated mechanism and said rotatable spindle for turning the latter at a gradually-decreasing rate of speed during the revolution of the camera, substantially as described.

15. In panoramic operating means for cameras, the combination of a spring-actuated drum, a rotatable spindle for actuating the film-operating means of the camera, and a cord wound at one end upon said spindle and at its opposite end upon said drum, the winding-surface for one end of said cord being tapered or cone-shaped, substantially as and for the purpose described.

16. In panoramic operating means for cameras, the combination of a spring-actuated drum, a rotatable spindle for actuating the film-operating means of the camera, a winding-cone secured upon said spindle, and a cord wound at one end upon said cone and at its opposite end upon said spring-actuated drum, substantially as and for the purpose described.

17. In panoramic operating means for cameras, the combination of a spring-actuated drum, a rotatable spindle for actuating the film-operating means of the camera, a cord wound at one end upon said spindle and at its opposite end upon said drum, a ratchet secured to said spindle, and a holding-pawl adapted to be engaged with said ratchet when the cord is withdrawn from the drum and wound upon the spindle, and to be disengaged from the ratchet to permit the spring-actuated drum to turn the spindle and rewind the cord upon the drum, substantially as described.

18. In panoramic operating means for cameras, the combination of a spring-actuated drum, a rotatable spindle for actuating the film-operating means of the camera, a cone secured upon said spindle, a cord wound at one end upon said cone and at its opposite end upon the spring-actuated drum, a ratchet secured upon the cone-spindle, and a holding-pawl adapted to be engaged with said ratchet when the cone-spindle is turned to withdraw the cord from the spring-drum and wind it upon the cone, and to be disengaged therefrom to permit the spring-drum to turn the cone-spindle and withdraw the cord and rewind it upon the drum, substantially as described.

HARVEY L. FISHER.

Witnesses:
LEONORA WISEMAN,
BESSIE SHADBOLT.